United States Patent [19]

Peuckert et al.

[11] Patent Number: 5,139,717
[45] Date of Patent: Aug. 18, 1992

[54] HIGH-STRENGTH CERAMIC COMPOSITE, PROCESS FOR ITS PREPARATION AND ITS USE

[75] Inventors: Marcellus Peuckert; Martin Brück, both of Hofheim am Taunus; Tilo Vaahs, Kelkheim; Hans-Jerg Kleiner, Kronberg/Taunus; Fritz Aldinger, Rodenbach, all of Fed. Rep. of Germany

[73] Assignee: Hoechst Aktiengesellschaft, Frankfurt am Main, Fed. Rep. of Germany

[21] Appl. No.: 444,014

[22] Filed: Nov. 30, 1989

[30] Foreign Application Priority Data

Dec. 3, 1988 [DE] Fed. Rep. of Germany ....... 3840780
Dec. 15, 1988 [DE] Fed. Rep. of Germany ....... 3842198

[51] Int. Cl.$^5$ .............................................. C04B 41/84
[52] U.S. Cl. ........................................ 264/60; 264/63; 264/65
[58] Field of Search ................. 264/63, 60, 65; 501/97

[56] References Cited

U.S. PATENT DOCUMENTS 3,853,567 12/1974 Verbeek .
4,110,386  8/1978 Yajima et al. ........................ 264/63
4,267,211  5/1981 Yajima et al. .
4,720,532  1/1988 Seyferth et al. .
4,935,481  6/1990 Vaahs et al. .
4,946,920  8/1990 Vaahs et al. ........................ 501/97

FOREIGN PATENT DOCUMENTS 0315907   5/1989 European Pat. Off. .
62-230673 10/1987 Japan .
86/06377 11/1986 PCT Int'l Appl. .
1197546   7/1970 United Kingdom .
2002734   2/1979 United Kingdom .

OTHER PUBLICATIONS

Washburne, S. S. et al, *J. Organometal. Chem.* 21:59–64 (1970).

*Primary Examiner*—James Derrington

[57] ABSTRACT

The invention relates to a high-strength ceramic composite, in particular made from silicon nitride, a process for its preparation and its use. The process comprises impregnating an open-pore matrix with a molten polysilazane in a first step and, in a second step, heating the impregnated matrix to 800° to 2500° C. under a blanketing gas, such as nitrogen or a noble gas, or to 800° to 1500° C. under a gas containing ammonia. The high-strength ceramic composite prepared can be used as a component to be subjected to high thermal, mechanical or corrosive stress.

11 Claims, No Drawings

HIGH-STRENGTH CERAMIC COMPOSITE, PROCESS FOR ITS PREPARATION AND ITS USE

The present invention relates to a high-strength ceramic composite, in particular based on silicon nitride, a process for its preparation and its use.

High-strength ceramic composites are used in increasing quantities in machine construction because of their high strength and resistance to corrosion and to high temperatures.

Silicon nitride ceramics can be obtained by reaction sintering, in an atmosphere of nitrogen, of moldings made from silicon powder. The "reaction-bound silicon nitride ceramics" (RBSN) prepared in this way are composed of crystalline α- and β-Si$_3$N$_4$ and have a residual porosity of 20–30% by volume. The flexural strength of the RBSN ceramics is however limited; in general the values are 150 to 300 MPa.

The flexural strength of RBSN ceramics can be improved by impregnation with polysilazanes dissolved in solvents and subsequent thermal decomposition of the polysilazanes, see JP-OS 62-230 673. The disadvantage with this process is the use of solvents. The solvents occupy a certain proportion of the space, which therefore cannot be filled by the polysilazanes and therefore remains as empty pore space after the decomposition of the polysilazanes. Further, it has been found that a closure of the pores on the surface takes place as a result of the use of solvents. Consequently the still empty pores in the inside of the matrix cannot be sufficiently filled with polysilazanes, even with repeated impregnation.

Consequently the object was to find a process for the preparation of high-strength ceramic composites, in which as far as possible all the pores of a matrix, not only the pores on the surface, can be filled with polysilazanes and in this way the density of the matrix can be increased. It is known that the flexural strength of ceramic composites increases with increasing density of the matrix.

One subject of the present invention is a process for the preparation of a high-strength ceramic composite, which comprises impregnating an open-pore matrix with a molten polysilazane in a first step and, in a second step, heating the impregnated matrix to 800° to 2500° C. under blanketing gas.

A suitable molten polysilazane is, for example, the compound of the formula (I)

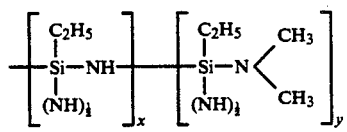

in which x and y denote the mole fractions of the two structural units and where $x+y=1$ and $x=0.7-0.95$.

The preparation of this compound is described in German Patent Application P 3,737,921.6. This application relates generally to the preparation of polymeric silazanes by reacting one or more dialkylaminoorganyldichlorosilanes of the formula RSiCl$_2$-NR'R', in which R=C$_1$-C$_4$-alkyl, vinyl or phenyl and R'=C$_1$-C$_4$-alkyl, with at least 3.35 moles of ammonia per mole of silane in a solvent at temperatures of −80° C. to +70° C.

According to S. S. Washburne, W. R. Peterson, J. Organometal. Chem. 21, (1970), page 59, the dimethylaminoethyldichlorosilane C$_2$H$_5$SiCl$_2$-N(CH$_3$)$_2$ (also refered to as "aminochlorosilane" in the following text) used as starting material for the polymeric silazanes of the formula (I) can be obtained by reacting ethyltrichlorosilane C$_2$H$_5$SiCl$_3$ with dimethylamine. The reaction is carried out in aprotic solvents, preferably polar, such as ethers, and in particular in THF.

The molar ratio of ethyltrichlorosilane to dimethylamine can assume values between 1:1 and 1:3; a ratio of about 1:2 is preferred.

The ammonium salts formed during the reaction precipitate out of the reaction solution, whilst the aminochlorosilane formed remains in solution.

The resulting aminochlorosilane of the formula C$_2$H$_5$SiCl$_2$-N(CH$_3$)$_2$ is reacted, per mole, with at least 3.35 moles, preferably with at least 3.5 moles of ammonia in aprotic solvents, preferably polar such as ethers, and in particular THF. This is effected at temperatures between −80° C. and +70° C., preferably at −10° C. to 0° C.

The resulting polymeric silazane of the formula (I) is completely soluble in all common aprotic solvents.

In the formula (I) Si is never bonded to Si directly, but always via a NH bridge. If for example $x=0.9$ (and therefore $y=0.1$), then 10% of the originally available dimethylamino groups are still contained in the polymer and 90% of the silicon atoms are cross-linked three times via NH bridges. The controllable ratio of x to y determines the degree of cross-linking and thus the viscosity and the processibility to a ceramic.

In this way values of $x=0.7-0.95$ ($y=0.3-0.05$) are obtained if at least 3.35 moles of NH$_3$ are used per mole of aminochlorosilane. Preferably $x=0.85-0.95$ ($y=0.15-0.05$); this is then the case if at least 3.5 moles of NH$_3$ per mole of aminochlorosilane are used. In general at most 8 moles, preferably at most 6 moles of NH$_3$ are used, per mole of aminochlorosilane. Naturally a larger relative quantity of NH$_3$ than 8 moles will also be successful, but this higher expense is unnecessary.

Gases which are suitable for use as blanketing gas during the heating of the impregnated matrix are, for example, nitrogen, noble gases, mixtures of the these gases or gases which are at least mainly composed of nitrogen or noble gases.

This reaction is carried out at a temperature of 800° C. to 2500° C., preferably 1000° C. to 2000° C. and in general at atmospheric pressure or under an excess pressure of up to approximately 150 bar.

Further, fillers, preferably compounds of magnesium, aluminum, yttrium or a rare earth metal, singly or as a mixture, can be dissolved in the molten polysilazane and the matrix impregnated with this melt instead of with pure polysilazane. Particularly suitable compounds for this purpose are the nitrates, alcoholates, acetates or acetylacetonates, singly or as a mixture.

Generally a single impregnation of the matrix with molten polysilazane followed by heating is sufficient. In some cases, however, an even higher matrix density, which is advantageous, can be achieved by means of one or more repeats of the impregnation—heating sequence.

Examples of suitable open-pore matrices are moldings made from oxides, nitrides, oxynitrides, carbides, silicides, silicates, phosphides or borides.

Particularly good results are obtained if a molding made from silicon nitride is used as the open-pore matrix.

The high-strength ceramic composite prepared according to the invention—in particular the aforementioned, prepared on the basis of a silicon nitride matrix——can be used as a component or high-wear part to be subjected to high thermal, mechanical or corrosive stress. If desired, it can be still further compacted by means of a hot pressure-sinter step.

An advantage of the process according to the invention is that during processing the molten polysilazane neither ages because of gel formation, nor cross-links or forms bubbles.

The total porosity of the matrix is calculated by dividing the measured matrix density by the theoretical density of the compact matrix. The equation valid for a pure silicon nitride ceramic composite (RBSN) is therefore:

$$\text{Total porosity in \%} = \frac{100 \cdot \text{measured density (g/ml)}}{3.185 \text{ (g/ml)}}$$

The open porosity was measured using the Porosimeter 2000 from Carlo Erba Strumentazione. The method of determination is described in "Experimental Methods in Catalytic Research" R. B. Anderson, Academic Press, New York 1968, p. 45 et seq.

The flexural strength was measured as 4-point bending strength using the Instron 1326 universal test apparatus, according to USA Standard Mil.-STD 1942:

4-point support with 40 mm/20 mm distance between the supports and a constant increase in force of 500 N/s on test pieces measuring 3.5 mm·4.5 mm·45 mm.

It has been found, that particularly good flexural strengths of ceramic composites according to the process according to the invention result if the matrix to be impregnated is first degassed in an autoclave and the polysilazane which was initially placed in the autoclave as a solid is then melted. Blanketing gas is then introduced into the autoclave under pressure. In general, excess pressures up to 500 bar, in particular from 1 to 50 bar, are completely adequate here.

In principle, temperatures up to 2500° C. can be used for the heating of the impregnated matrix. However, at temperatures above about 1600° C. the process must then be carried out under high nitrogen pressure to avoid decomposition of the $Si_3N_4$. In general, it is therefore more favourable to heat the impregnated matrix only to 1100° to 1400° C. In this case a polysilazane decomposition product is formed which has approximately the following composition:

45±5 (%) Si
30±5 (%) N
25±5 (%) C
3±2 (%) O

Instead of working under blanketing gases such as nitrogen or noble gas, the impregnated matrix can also be heated in an atmosphere of ammonia, for which a temperature of 800° to 1500° C. is to be selected. This is a further subject of the present invention.

In this reaction the polysilazane is converted into $Si_3N_4$ having a low carbon content. Intermediate stages between $Si_3N_4$ and the decomposition product having the previously quoted composition are obtained if the process is carried out under nitrogen and ammonia and a decomposition temperature of approximately 800° to 1500° C. and a short decomposition time are chosen.

A further subject of the present invention is the preparation of a high-strength silicon nitride ceramic composite (RBSN) with a carbon content of under 0.5% by weight, an oxygen content of under 4% by weight and an open porosity of less than 10%, which comprises impregnating a silicon nitride matrix having an open porosity of 10 to 30% in a first step with a molten polysilazane of the formula (I)

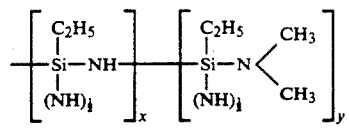

in which x and y denote the mole fractions of the two structural units and where $x+y=1$ and $x=0.7–0.95$, and, in a second step, heating the impregnated matrix to 800° to 1500° C. under a gas containing ammonia.

On decomposition of the polysilazane under ammonia as the blanketing gas, a white to light grey-coloured ceramic composite is obtained; in a nitrogen or noble gas atmosphere a dark-coloured ceramic composite results.

After the decomposition of the polysilazane approximately 60 to 70% of the weight of polysilazane originally used for impregnation is still present in the matrix. Since with the process according to the invention the pores on the surface of the matrix remain open, the density of the matrix can be further increased by repeated impregnation—decomposition steps.

The crystallinity of the silicon nitride formed by decomposition is controllable by means of the decomposition temperature:

At a decomposition temperature between 800° and about 1200° C. amorphous silicon nitride is formed; above a decomposition temperature of about 1200° C. crystalline α-silicon nitride is formed, which with a longer heating time and above about 1500° C. converts to β-silicon nitride.

For the impregnation of polysilazane into a silicon nitride matrix together with fillers, approximately 0.05 to 0.6 moles of the filler per 100 g of finished molding can be introduced into the matrix.

By subjecting the $Si_3N_4$ ceramic composite according to the invention to an additional hot pressure-sinter step flexural strengths of 500 to 600 MPa are achievable.

The examples illustrate the invention:

EXAMPLE 1

A molding of reaction-bound silicon nitride (RBSN) having 17.0% open porosity, a density of 2.43 g/ml and measuring 3.5 mm·4.5 mm·45 mm, together with 50 g of polysilazane of the formula (I) with $x=0.9$ and $y=0.1$, is evacuated down to 0.001 bar in an autoclave, subsequently warmed to 80° C. and placed under a pressure of 30 bar of nitrogen. After 5 hours the autoclave is cooled to room temperature and the pressure released. The molding is freed from adhering polysilazane by grinding and heated in a stream of nitrogen (10 l/h $N_2$) in the course of 10 hours to 1100° C., held for 1 hour at this temperature and cooled to room temperature.

The density of the impregnated and heated molding was measured as 2.74 g/ml and the 4-point bending strength was determined as 347 MPa. In comparison the RBSN used as starting material had a 4-point bending strength of only 188 MPa.

EXAMPLE 2

A ceramic composite molding was prepared as in Example 1. The molding was then again together with the same polysilazane as in Example 1 evacuated down to 0.001 bar in an autoclave, subsequently warmed to 80° C., placed under a pressure of 30 bar with nitrogen and further treated as described in Example 1.

The density of the molding was determined as 2.87 g/ml.

The 4-point bending strength was 420 MPa.

EXAMPLE 3

Example 2 was repeated except that now the molding was impregnated a third time with polysilazane. After this the polysilazane decomposition was carried out in the same manner as in Example 1 and 2.

The material parameters are summarized in the table. For clarification of the present invention the material parameters of the starting matrix and those of the ceramic composites of Examples 1 and 2 were additionally included in the table.

TABLE

| | Starting Matrix | Example 1 | Example 2 | Example 3 |
|---|---|---|---|---|
| Total porosity (%) | 23.8 | 14.3 | 10.4 | 8.8 |
| Open porosity (%) | 17.0 | 6.9 | 2.7 | 0.9 |
| Density (g/ml) | 2.43 | 2.74 | 2.87 | 2.92 |
| 4-point bending strength (30/20) (MPa) | 188 | 347 | 420 | 463 |

EXAMPLE 4

Example 1 was repeated except that now the autoclave was placed under a pressure of 10 bar with nitrogen. The impregnated molding was heated in a stream of ammonia (10 l/h) in the course of 10 hours to 1150° C. under an ammonia pressure of 5 bar and held at this temperature for 3 hours. After cooling to room temperature, the molding was white-grey coloured and had a density of 2.48 g/ml, and a 4-point flexural strength of 331 MPa.

The analysis gave:
0.32% by weight C
2.9% by weight O

The open porosity was determined as 7.2% and the proportion of the amorphous intercalated $Si_3N_4$ as 6% by weight.

I claim:

1. A process for the preparation of a high-strength ceramic composite, which comprises:
   in a first step, impregnating an open-pore matrix with a molten polysilazane of the following formula (I)

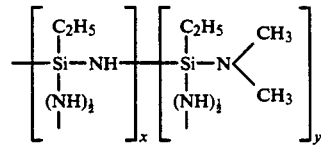

in which x and y denote the mole fractions of the two structural units and where $x+y=1$ and $x=0.7-0.95$, and wherein each $(NH_{\frac{1}{2}})$ denotes a single NH group linked to the Si atom and the second Si atom, and in a second step, heating the impregnated matrix to 800° to 2500° C. under a blanketing gas.

2. The process as claimed in claim 1, wherein nitrogen or a noble gas or a mixture of these gases is used as the blanketing gas.

3. The process as claimed in claim 1, wherein the impregnated matrix is heated to 1000° to 2000° C.

4. The process as claimed in one of claim 1, wherein a molding made from oxide, nitride, oxynitride, carbide, silicide, silicate, phosphide and/or boride is used as the open-pore matrix.

5. The process as claimed in one of claim 1, wherein a molding made from silicon nitride is sued as the open-pore matrix.

6. The process as claimed in one of claim 1, wherein a filler is dissolved in the molten polysilazane before the impregnation.

7. The process as claimed in claim 6, wherein compounds of magnesium, aluminum, yttrium or a rare earth metal are used singly or as a mixture as the filler.

8. The process as claimed in claim 7, wherein the nitrates, alcoholates, acetates or acetylacetonates are used singly or as a mixture as compounds of the named metals.

9. The process as claimed in one of claim 1, wherein the impregnation and heating sequence is repeated one or more times on the same matrix.

10. A process for the preparation of a high-strength silicon nitride ceramic composite with a carbon content of under 0.5% by weight, an oxygen content of under 4% by weight and an open porosity of less than 10%, which comprises impregnating a silicon nitride matrix having an open porosity of 10 to 30% in a first step with a molten polysilazane of the formula

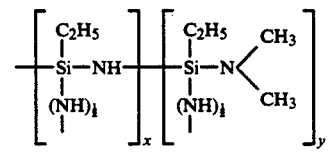

in which x and y denote the mole fractions of the two structural units and where $x+y=1$ and $x=0.7-0.95$ and wherein each $(NH_{\frac{1}{2}})$ denotes a single NH group linked to the Si atom and a second Si atom, and in a second step, heating the impregnated matrix to 1000° to 1500° C. under a gas containing ammonia.

11. The process according to one of claims 1 or 10, wherein the high-strength ceramic composite prepared os further compacted by means of a subsequent hot pressure-sinter step.

* * * * *

UNITED STATES PATENT AND TRADEMARK OFFICE
CERTIFICATE OF CORRECTION

PATENT NO. : 5,139,717

DATED : August 18, 1992

INVENTOR(S) : Marcellus Peuckert, et al

It is certified that error appears in the above-identified patent and that said Letters Patent is hereby corrected as shown below:

In Claim 1 at Column 6, Line 12
  "$(NH_{1/2}$" should read -- $(NH)_{1/2}$ --.

In Claim 1 at Column 6, Line 13
  "the", second occurrence, should read -- a --.

In Claim 4 at Column 6, Line 22
  delete "one of".

In Claim 5 at Column 6, Line 25
  delete "one of".

In Claim 5 at Column 6, Line 26
  "sued" should read -- used --.

In Claim 6 at Column 6, Line 28
  delete "one of".

In Claim 9 at Column 6, Line 38
  delete "one of".

UNITED STATES PATENT AND TRADEMARK OFFICE
CERTIFICATE OF CORRECTION

PATENT NO. : 5,139,717

DATED : August 18, 1992

INVENTOR(S) : Marcellus Peuckert, et al

It is certified that error appears in the above-identified patent and that said Letters Patent is hereby corrected as shown below:

In Claim 10 at Column 6, Line 59
"$(NH_{1/2}$" should read -- $(NH)_{1/2}$ --.

In Claim 11 at Column 6, Line 65
"os" should read -- is --.

Signed and Sealed this

Seventh Day of December, 1993

Attest:

BRUCE LEHMAN

*Attesting Officer*    *Commissioner of Patents and Trademarks*